July 22, 1924.

G. MORRIS

DIRIGIBLE HEADLIGHT

Filed June 15, 1923

1,502,515

Gideon Morris
INVENTOR

WITNESSES
Louis Goodman
Howard D. Orr

BY
C. G. Siggers
ATTORNEY

Patented July 22, 1924.

1,502,515

UNITED STATES PATENT OFFICE.

GIDEON MORRIS, OF GRAND SALINE, TEXAS, ASSIGNOR OF ONE-HALF TO WILLIS H. ROBERSON, OF GRAND SALINE, TEXAS.

DIRIGIBLE HEADLIGHT.

Application filed June 15, 1923. Serial No. 645,602.

*To all whom it may concern:*

Be it known that I, GIDEON MORRIS, a citizen of the United States, residing at Grand Saline, in the county of Van Zandt and State of Texas, have invented new and useful Improvements in Dirigible Headlights, of which the following is a specification.

This invention relates to dirigible head lights for automobiles.

The object is to provide mechanism for controlling the front head lights on automobiles whereby the same may be automatically turned to the right or left in accordance with the direction in which the steering wheels are turned so that the rays of light may illuminate the path being followed by said wheels.

Another object is to provide locking means for the said mechanism which may be operated from the dash board of the car within easy reach of the operator, said locking means being readily thrown into position too engage the light shifting means to prevent the said lights from turning to either side, while permitting the steering wheels to turn as desired in the operation of steering the car.

A final object is to provide means for accomplishing these purposes which is simple in construction and which may be cheaply manufactured and readily applied to the car without the necessity for any material change in the same, and which is strong and durable and quick and efficient in action to direct the lights in the desired manner to follow the steering wheels when in unlocked position, and to remain stationary towards the front of the car when locked while permitting the turning of the said wheels at any angle desired.

A full and complete understanding of the invention may be obtained from a consideration of the following detailed description, taken in connection with the accompanying drawing forming a part of this specification, it being understood that while the drawing shows a practical form of the invention, the latter is not confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures.

Figure 1:
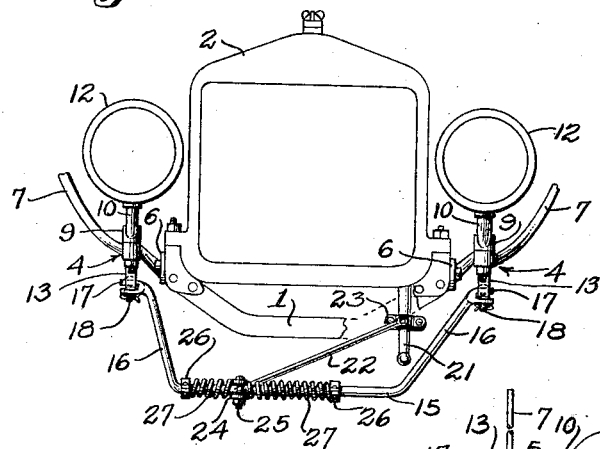
Figure 1 is a front elevation of the chassis and radiator of a car together with the head lights and showing the improved automatic shifting means for the latter applied thereto.

Referring to the drawing, there is shown the front end portion of the chassis 1, having the usual radiator 2 supported thereby, and in rear thereof and sufficiently spaced therefrom is the dash board 3, all of the usual construction. Lamp brackets 4 are secured at the front ends of the frame members of the chassis, each bracket comprising a vertically disposed post 5 having an inwardly extending arm secured to an attaching plate 6 for connection to said chassis, the post also having connected thereto, near its base, an outwardly and upwardly extending fender support or brace 7.

Pivotally mounted on the post 5 is a lamp bracket 8, which is provided with a vertically disposed bearing sleeve 9 for the reception of said post, and having a forwardly directed arm 10 for connection to the attaching plate 11 which is secured to the lamp 12. Extending rearwardly from each sleeve 9 is another downwardly-inclined arm 13, the lower end of which is bent horizontally and formed into an eye 14. As thus far described, the arrangement is identical on each side of the car.

Located beneath the chassis and in a position not to interfere with any of the other working parts thereof, is a transversely disposed, lamp-swinging rod 15, having its opposite end portions bent upwardly, as at 16, and formed into an apertured fork 17 for the reception of the aforesaid eyes 14 of the lamp brackets, a pin or bolt 18 passing through the same to pivotally connect the two together.

A steering post 19 is mounted in the usual bearing 20 and extends through the dash board 3, the lower end of said post, where extending below the bearing 20, being provided with the angularly disposed crank arm 21 having the usual ball and socket connection with the rod for turning the steering wheels, which is not deemed necessary to be shown in the drawing.

A connecting arm or pitman 22 is pivotally connected at one end to a clamp 23 which is secured to an intermediate portion of the crank arm 21, said pitman extending across the chassis and forwardly, where the terminal is bent longitudinally of the car and provided with a bifurcation 24 for the reception of the transverse, lamp-swinging rod 15, a pin or bolt 25 being passed through the ends of the bifurcation to prevent accidental dislodgment of such connection.

Figure 2:
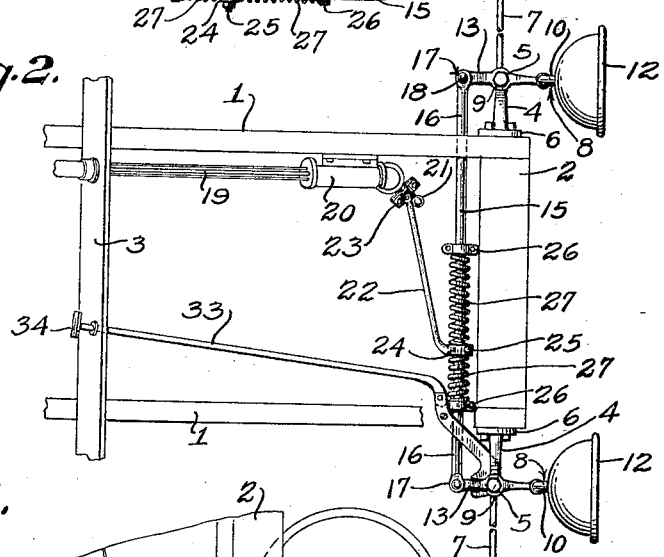
Figure 2 is a plan view of the subject matter of Figure 1.
Figure 3:
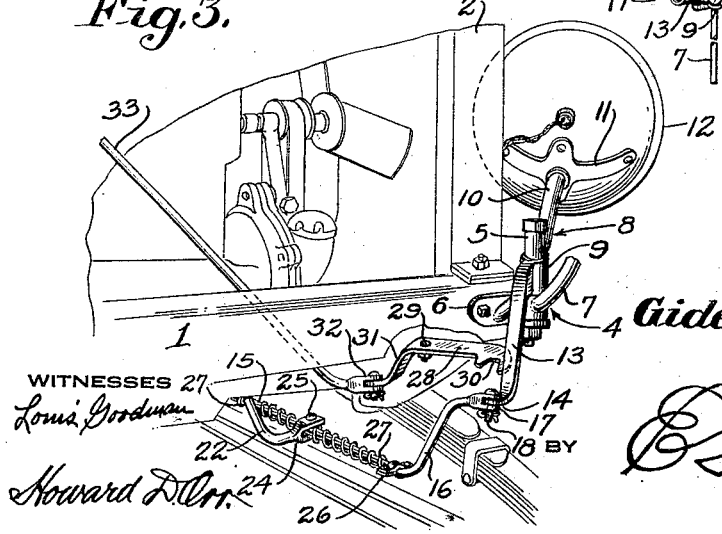
Figure 3 is a detail perspective view, looking from the rear, and showing the mechanism for locking the lamps from turning.

Ordinary clamps 26 are secured to the rod 15 in spaced relation to the bifurcation 24, the latter being located adjacent to the side of the frame of the car opposite to the steering post, as clearly shown in Figure 2 of the drawing, and said clamps may consist of two members rigidly held in adjusted position on said bar by suitable screws or bolts or an ordinary sleeve held by a set screw may be used in lieu thereof, as will be understood.

Interposed between the bifurcation 24 and the opposite clamps 26 are coiled springs 27 surrounding the lamp-swinging rod 15 and having their opposite ends bearing against said bifurcation and the clamps, so that when the steering post is turned in either direction to turn the steering wheels as desired, the connecting arm or pitman 22 is moved in one direction or the other, as the case may be, and a yielding force is imparted to the lamp-swinging rod, through the medium of the cushioning springs 27, and the lamps are turned correspondingly with the wheels to project the light therefrom in exact alinement with the course the wheels are taking. When the device is properly installed on the car, with the clamp 23 adjusted on the crank arm 21 to give just the proper amount of throw to the lamps, and the clamps 26 properly adjusted on the lamp-swinging rod, the pressure of the pitman is not sufficient to materially compress either of the springs, and a uniform movement of the lamps will result and to just the proper degree to correspond with the movement of the steering wheels.

The connection between the end of the pitman and the clamp on the crank arm is loose enough to permit of the rotary movement of the latter without binding, and the bifurcation 24 is large enough to permit the rocking movement of the pitman during the operation of turning the steering post.

When it is desired to lock the lamps against movement to conform to the movement of the steering wheels, as is sometimes advisable, a locking lever 28 is provided which is fulcrumed intermediate of its length upon a pivot bolt 29, passing upwardly through the same and into the lower flange of the side bar of the chassis, the said lever being provided on its outer end with spaced lugs on its rear edge to provide a seat or engaging end 30 in proper position, when the lever is swung about its pivot, to receive the adjacent arm 13 of that lamp bracket opposite to the side of the car having the steering post. The inner end of the locking lever is bent downwardly, as at 31, and connected to the bifurcated end 32 of the actuating rod 33 which passes upwardly and rearwardly to the dash board 3, through which said rod passes, and is provided with a handle 34 within easy reach of the operator.

When the rod 33 is pulled rearwardly, the outer end of the locking lever 28 is moved forwardly to remove the lugs from engagement with the arm 13, and the lamps are free to be actuated simultaneously with the movement of the steering wheels, and when the latter are in longitudinal alinement with the car, or in straight ahead position, and it is desired to lock said lamps, it is only necessary to push forwardly on the rod 33 when the seat 30 of the locking lever is brought rearwardly into engagement with the arm 13.

When the lamps are locked as described, the steering wheels may be freely actuated to steer the machine by reason of the fact that the bifurcation 24 will slide along the rod 15 in either direction, one or the other of the springs 27 being compressed against the rigid clamps 26 on the rod 15, which is held rigid by the locking lever 28.

From the foregoing it will be seen that a simple, cheaply manufactured, and easily installed device has been provided for causing the headlights of an automobile to turn in accordance with the direction of movement of the steering wheels, and that simple and efficient means has been provided for locking or unlocking the lamps with the steering means for accomplishing such purposes.

What is claimed is:—

1. In a dirigible headlight, opposite lamp supports having posts and secured to the opposite sides of the car, lamp brackets pivoted on the posts and carrying lamps and having rearwardly directed arms, a transverse rod pivotally connected to the rear ends of said arms and passing beneath the chassis of the car, and a pitman having one end bifurcated to span the rod with a pin connected to the bifurcation to hold it to the rod, and pivotally connected at the other end to the steering crank arm for transmitting motion to the lamps to move the same in unison with the steering wheels, said transverse rod having adjustable stops secured thereon in spaced relation to the slidable connection of the pitman, and coiled springs surrounding the rod between the bifurcated end of the pitman and the stops to cushion the force imparted by the pitman to the transverse rod.

2. In a dirigible headlight, opposite lamp supports having posts and secured to opposite sides of the car, lamp brackets pivoted on the posts and carrying lamps and having rearwardly directed arms, a transverse rod pivotally connected to the rear ends of said arms and passing beneath the chassis of the car, a pitman connected at one end to the transverse rod and pivotally connected at the other end to the steering crank arm for transmitting motion to the lamps to move the same in unison with the steering wheels, a locking lever pivoted intermediate its ends to the frame bar and having a seat for the reception of one of the rearwardly directed arms of the lamp brackets, and a pull rod extending to the dash board and connected to the locking lever and adapted to swing the latter to engage the lamp bracket arm to lock the lamps from movement while permitting the steering wheels to be turned.

In testimony, that I claim the foregoing as my own I have hereto affixed my signature.

GIDEON MORRIS.